United States Patent [19]

Heinrich et al.

[11] Patent Number: 5,601,716
[45] Date of Patent: Feb. 11, 1997

[54] FILTER MATERIAL

[75] Inventors: Günter Heinrich, Gernsbach; Roland Köchel, Rheinstetten, both of Germany

[73] Assignee: PAPCEL - Papier und Cellulose Technologie-und Handels-GmbH, Gernsbach, Germany

[21] Appl. No.: 654,788

[22] Filed: May 29, 1996

Related U.S. Application Data

[63] Continuation of Ser. No. 268,565, Jul. 6, 1994, abandoned.

[30] Foreign Application Priority Data

Dec. 1, 1993 [DE] Germany ............................ 9318405 U

[51] Int. Cl.$^6$ ................................................. B01D 39/04
[52] U.S. Cl. ............................ 210/490; 210/505; 210/508
[58] Field of Search .................................. 210/490, 505, 210/508; 428/286, 326

[56] References Cited

U.S. PATENT DOCUMENTS

| | | | |
|---|---|---|---|
| 4,129,132 | 12/1978 | Butterworth et al. ................... | 128/287 |
| 4,650,506 | 3/1987 | Barris et al. ........................ | 210/505 X |
| 4,917,942 | 4/1990 | Winters ................................ | 428/286 |
| 5,145,727 | 9/1992 | Potts et al. .......................... | 428/198 |
| 5,294,482 | 3/1994 | Gessner ................................ | 428/287 |

*Primary Examiner*—Frank Spear
*Attorney, Agent, or Firm*—Breiner & Breiner

[57] ABSTRACT

The invention concerns a filter material particularly useful in the manufacture of tea bags, coffee bags, coffee filters and the like. The filter material includes an at least two layer non-woven substrate material wherein the two layers are essentially planar and superimposed, one layer is composed of natural fibers and one layer is composed of synthetic fibers. The synthetic fiber layer includes a plurality of individual plastic fibers which are deposited in a heated state on the natural fiber layer. The plastic fibers fuse with each other and also fuse with the natural fibers of the other layer. The filter material provides the particular advantage, due to the deposition of the individual plastic fibers on the natural fibers, of covering or closing a large number of pores or ducts in the natural fiber layer. The filter material of the invention has a low particle discharge since only minimal cross-pores are present in the filter material based on the tangled and closed filter material formed by the arrangement and fusing of synthetic fibers on the natural fiber layer.

14 Claims, 1 Drawing Sheet

FILTER MATERIAL

This is a continuation of co-pending application Ser. No. 08/268,565 filed Jul. 6, 1994.

FIELD OF THE INVENTION

The invention is directed to a filter material including an at least two layer non-woven substrate material wherein a first layer is made on a paper-making machine and is composed of natural fibers, and a second layer is made of synthetic fibers. The two layers are each substantially planar and are superimposed in relation to each other.

BACKGROUND OF THE INVENTION

Filter materials are well known and widely used as filter paper, for example, in making tea bags, coffee bags, coffee filters and the like. Conventional filter materials consist of one layer of natural fibers which extends in a substantially planar manner and is covered by a substantially planar heat-sealing plastic layer. These filter materials are manufactured by forming, in a first run on a paper-making machine, a base layer predominantly consisting of natural fibers. Thereafter, the material is partially dehydrated using a vacuum chamber. Next, a second layer consisting of heat-sealing plastic fibers is deposited on the base layer. The second layer is then dehydrated through the base layer resulting in the formation of essentially straight ducts or pores which cross between both layers.

Products made from the above-described filter materials, such as tea or coffee bags, are intended to retain a maximum amount of particles, for example tea or coffee particles, while allowing for the rapid diffusion of hot water through the filter material in order to achieve an aromatic, well-colored beverage in a short time. Accordingly, the filter material must be commensurately porous. Previously, a trade-off had to be obtained between a filter material with minimal particle transmission and a filter material capable of high liquid diffusion. The straight pores extending through the filter material as described above does insure high water or other liquid diffusion, but such material is disadvantageous with regard to particle transmission, especially in making tea or coffee bags, since the straight cross-pores permit passage of a correspondingly large quantity of particles through the filter material.

OBJECTS AND BRIEF DESCRIPTION OF THE INVENTION

In light of the above state of the art, the object of the present invention is to provide a filter material having improved liquid permeability and solid retention which is in particular useful with extracts such as coffee, tea and the like.

The present invention provides a filter material including an at least two layer non-woven substrate material wherein a first layer is composed of natural fibers and is manufactured on a paper-making machine, and a second layer is composed of synthetic fibers, wherein the first and second layers are substantially planar and superimposed with respect to each other, and wherein the second synthetic fiber layer comprises a plurality of individual synthetic or plastic fibers deposited in a heated state on the natural fiber layer and thereby allows the synthetic fibers to fuse between themselves as well as with the layer of natural fibers.

When depositing the plurality of individual synthetic fibers on a natural fiber layer as set forth above, filter material of the invention is provided wherein, advantageously, a large number of pores or ducts of the natural fiber layer are covered and/or sealed by the second layer. The superimposition of pores of the synthetic fiber layer with the pores of the natural fiber layer in this manner essentially prevents particles from passing through the filter material. Accordingly, the filter material of the invention discharges only a minute quantity of particles since the number of cross-pores is minimal. A tangled and closed filter material results substantially from the arrangement of individual synthetic fibers on the natural fiber layer. The closed or tangled pores in the at least two layer substrate filter material of the invention, while obstructing particles such as tea or coffee particles, is permeable to hot water or other liquids. Liquids can readily diffuse through the offset and tangled pores of the filter material of the invention.

The invention provides a further advantage in that the natural fiber layer can be manufactured on a conventional paper-making machine. A natural fiber layer made on a paper-making machine provides for a high permeability to air because of the large number of pores created in the layer. The synthetic layer is made in another process and combined with the natural fiber layer. For example, plastic granulates are melted in an extruder and forced through a plurality of very fine dies. The fine fibers so made are referred to as filaments and are swirled by means of a hot flow of air and torn apart. Thereupon, these still adhesive plastic filaments are deposited on the natural fiber layer which is passed beneath the extruder. At that time, the filaments fuse with themselves and with the natural fibers of the first layer. The plastic filaments, generally, are from about 0.3 to 10 µm in diameter, preferably about 0.5 to 3 µm in diameter. Upon combining the natural fiber layer with the filaments, pores are produced between the filaments.

As regards a filter material according to the invention, it has been determined to be particularly advantageous to provide the natural fiber layer with a basis weight or weight per unit area of from about 8 to 40 g/m$^2$, preferably 14 g/m$^2$ and most preferably 12 g/m$^2$; and an air permeability of from about 300 to 4,000 l/m$^2$ per second, preferably 1,600 l/m$^2$ per second and most preferably 2,000 l/m$^2$ per second. Good filtration is in particularly achieved when the synthetic layer of the filter material has a weight per unit area of from about 1.0 to 15 g/m$^2$, preferably 2.5 g/m$^2$ and most preferably 5 g/m$^2$.

Accordingly, an advantageous filter material is formed when the weight per unit area of the filter material for both layers together is about 16.5 to 17 g/m$^2$. When measuring by means of a defined shaker at a specified amplitude and frequency for two minutes, it was determined that less than 0.5% particles having a grain size of between 110 to 150 µm is discharged, i.e., diffuses, through the filter material. In comparison, a conventional filter material with the same weight as the filter material of the invention discharges 20% of the particles held thereby when using the same measuring method.

The filter material of the invention evinces the above advantages in particular when the layer of synthetic fibers is made by the melt-blown method. Furthermore, a filter material prepared using a melt-blown made layer of synthetic fibers provides the advantage that in the manufacture of heat-sealed tea or coffee bags, the heat-sealable sides are mutually sealed in the packing machine. As a result, all of the synthetic material or plastic is available for sealing and a high seal-seam strength is achieved for both the dry and wet states of the manufactured article. Regarding conventional heat-sealable tea or coffee bag papers, only a small portion of the plastic fibers is available for heat sealing since part of the synthetic fibers is drawn into the natural fiber layer during the manufacturing process on the paper-making machine.

Highly advantageous filtering is achieved with the filter material of the invention when the natural fiber layer of the filter material includes a mixture of coniferous and hardwood cellulose, manila fibers or the like, and cellulose regenerated fibers. Further, the natural fiber layer is preferably manufactured to be mechanically strong in the wet state. Preferably, a thermoplastic is used for making the synthetic layer. Particularly preferred plastics are polypropylene or polyethylene.

Further advantages and features of the invention are elucidated in the description set forth below and the associated drawing.

DETAILED DESCRIPTION OF PRESENTLY PREFERRED EMBODIMENTS

Figure 1:
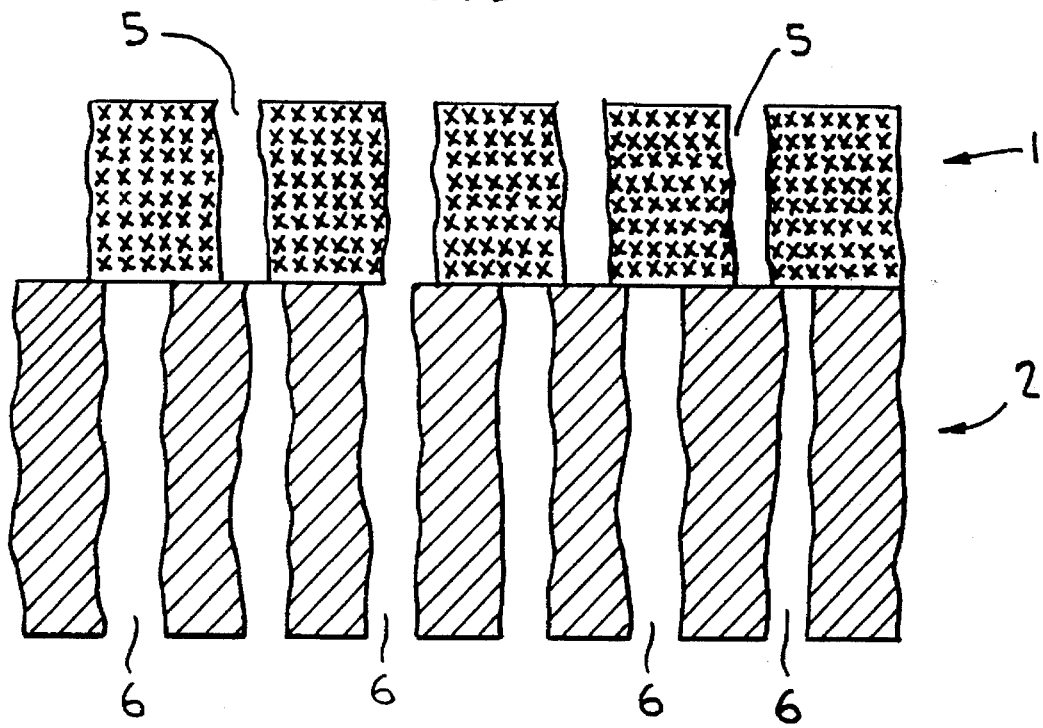
FIG. 1 is a partial sectional side view of a filter material according to the invention.
Figure 2:
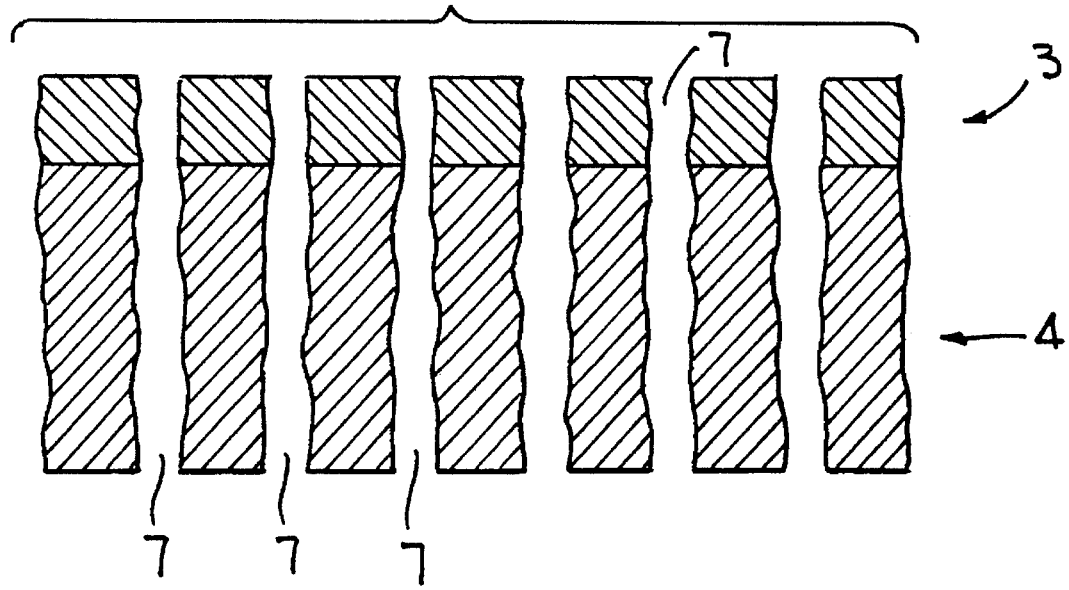
FIG. 2 is a partial sectional side view of a conventional filter material as known in the art.

The filter materials shown in FIGS. 1 and 2 include two essentially planar superimposed layers 1 and 2, and 3 and 4, respectively. The base layer 2 of FIG. 1 is composed of natural fibers, such as, for example, a mixture of coniferous or hardwood cellulose, manila fibers or the like, and regenerated cellulose fibers. The weight per unit area of layer 2 preferably is about 14 g/m² or more preferably 12 g/m². Layer 2 also has a permeability to air preferably of about 1,600 l/m² per second or more preferably of about 2,000 l/m² per second.

A second layer of synthetic fibers 1 and 3, respectively with regard to FIGS. 1 and 2, are superimposed on layers 2 and 4, respectively. Layer 1 of FIG. 1 is preferably composed of polypropylene or polyethylene fibers deposited by a conventional melt-blown method on the lower layer 2. The weight per unit area of layer 1 preferably is about 2.5 g/m² or more preferably 5 g/m². As a result, the total weight per unit area of the filter material including layers and 1 and 2 is about 16.5 g/m² and 17 g/m².

As shown in FIG. 1, pores 5 are present between the individual synthetic fibers in upper layer 1. Also, a plurality of pores 6 are present in lower layer 2. The pores are shown arrayed in such a manner that pores 5 generally do not coincide with pores 6 whereby the majority of pores 5 terminate on the surface of the second layer 2 and the majority of pores 6 terminate at the lower side of layer 1.

On the other hand, conventional filter materials as shown in FIG. 2 include pores 7 substantially in the form of straight ducts which pass through both the upper synthetic fiber layer 3 and the lower natural fiber layer 4. Accordingly, pores 7 provide direct communication between the upper side of layer 3 and the lower side of layer 4 thereby allowing particles, such as tea or coffee particles, to diffuse through the filter material. This is undesirable.

The filter material of the invention as shown in FIG. 1 evinces a seal-seam strength of about 2.0 Newton (N) per 15 mm of strip width, whereas the conventional filter material as shown in FIG. 2 has a seal-seam strength of 1.2–1.4 N/15 mm of strip width. The 15 mm wide strips are sealed before measuring the seal-seam strength at a temperature of 210° C. and a pressure of 3 bars over a time interval of 0.5 seconds.

A preferred application of the filter material of the present invention is as a filter paper for making tea bags, coffee bags, coffee filters, or the like. Further, in the preferred application of the filter material, two of the two layer non-woven substrates can be superimposed on each other and joined together by heat sealing to provide a filter material. This alternative embodiment of the invention also has with good liquid permeability while providing for the substantial retention of solids by the filter material.

As will be apparent to one skilled in the art, various modifications can be made within the scope of the aforesaid description. Such modifications being within the ability of one skilled in the art form a part of the present invention and are embraced by the appended claims.

It is claimed:

1. A filter material for use in preparing tea or coffee beverages comprising an at least two layer non-woven substrate material wherein a first layer has a plurality of pores therein, is made on a paper-making machine and is composed of natural fibers; a second layer has a plurality of pores therein and comprises a plurality of individual synthetic fibers deposited in a heated state onto said first layer such that said synthetic fibers are fused with each other and with the natural fibers; said first layer and said second layer are substantially planar and superimposed with respect to each other; and said pores of said second layer are arrayed in such a manner to said pores of said first layer that a majority of the pores of the second layer do not coincide with pores of the first layer such that said filter material simultaneously readily diffuses liquid through said first layer and said second layer while substantially retaining solids on said filter material.

2. Filter material according to claim 1 wherein said first layer has a weight per unit area of about 8 to 40 g/m² and a permeability to air of about 300 to 4,000 l/m² per second.

3. Filter material according to in claim 2 wherein said weight per unit area is 12 g/m² and said permeability to air is 2,000 l/m² per second.

4. Filter material according to claim 2 wherein said weight per unit area is 14 g/m² and said permeability to air is 1,600 l/m² per second.

5. Filter material according to any one of claims 1, 2, 3 or 4 wherein said second layer has a weight per unit area of between about 1.0–15 g/m².

6. Filter material according to claim 5 wherein said weight per unit area is 5 g/m².

7. Filter material according to claim 5 wherein said weight per unit area is 2.5 g/m².

8. Filter material according to claim 1 wherein said synthetic fibers are thermoplastic fibers.

9. Filter material according to claim 8 wherein said thermoplastic fibers are polypropylene or polyethylene fibers.

10. Filter material according to claim 1 wherein the second layer is manufactured by means of a melt-blown method.

11. Filter material according to claim 1 wherein the natural fibers of said first layer are selected from the group consisting of a mixture of coniferous and hardwood cellulose, manila and manila-like fibers, and regenerated cellulose fibers.

12. Filter material according to claim 1 wherein said first layer is mechanically strong when wet.

13. Filter material according to claim 1 wherein two of said two layer non-woven substrate material are superimposed on each other and are joined together by heat-sealing.

14. Filter material according to claim 1 or claim 13 constructed and arranged to provide a tea bag, coffee bag or coffee filter.

* * * * *